US005710230A

United States Patent [19]
Steppan et al.

[11] Patent Number: 5,710,230
[45] Date of Patent: Jan. 20, 1998

[54] CYCLOALIPHATIC DIISOCYANATE BASED RIM ELASTOMERS

[75] Inventors: David D. Steppan, Gibsonia; Neil H. Nodelman, Upper St. Clair, both of Pa.; Eduard Mayer, Dormagen, Germany; A. Donald Meltzer, Brecksville, Ohio; Albert Magnotta, Monaca, Pa.

[73] Assignees: Bayer Corporation, Pittsburgh, Pa.; Bayer Aktiengesellschaft, Leverkusen, Germany

[21] Appl. No.: 657,494

[22] Filed: Jun. 4, 1996

[51] Int. Cl.$^6$ ................................................ C08G 18/75
[52] U.S. Cl. ...................... 528/53; 528/56; 528/58; 528/68; 528/76; 528/77; 264/328.1; 521/125; 521/127; 521/129; 521/176
[58] Field of Search ..................... 528/76, 77, 68, 528/53, 58, 56; 264/328.1; 521/176, 125, 127, 129

[56] References Cited

U.S. PATENT DOCUMENTS

| 4,218,543 | 8/1980 | Weber et al. | 521/51 |
|---|---|---|---|
| 4,269,945 | 5/1981 | Vanderhider et al. | 521/159 |
| 4,642,320 | 2/1987 | Turner et al. | 521/179 |
| 4,764,543 | 8/1988 | Savina | 521/160 |
| 4,772,639 | 9/1988 | Pilger et al. | 521/124 |
| 4,937,366 | 6/1990 | Nodelman | 521/163 |
| 5,260,346 | 11/1993 | Cassidy et al. | 521/159 |
| 5,502,147 | 3/1996 | Nodelman et al. | 528/49 |
| 5,502,150 | 3/1996 | Steppan et al. | 528/60 |

*Primary Examiner*—Rachel Gorr
*Attorney, Agent, or Firm*—Joseph C. Gil; N. Denise Brown

[57] ABSTRACT

This invention relates to a process for the production of polyurethane/urea moldings from a reaction injection molding process by processing the reaction mixture consisting of a diisocyanate and an isocyanate-reactive component via the one-shot process at an isocyanate index of about 80 to 130. The diisocyanate is an unmodified cycloaliphatic diisocyanate. The isocyanate-reactive component consists of 1) at least one polyol having functional groups which are hydroxyl groups, amine groups, or mixtures of hydroxyl groups and amine groups such that the equivalent ratio of hydroxyl groups to amine groups is from 0:1 to 1:1, and 2) at least one chain extender which is selected from diols, triols, primary aliphatic amines, secondary aliphatic amines, aminoalcohols and mixtures thereof. The equivalent ratio of hydroxyl groups to amine groups in the chain extender component is from 1:2 to 10:1. A catalyst capable of catalyzing the reaction between isocyanate groups and isocyanate-reactive groups is also present in the reaction mixture.

12 Claims, No Drawings

CYCLOALIPHATIC DIISOCYANATE BASED RIM ELASTOMERS

BACKGROUND OF THE INVENTION

This invention relates to a process for the production of polyurethane/urea moldings from a reaction injection molding process of a reaction mixture via the one-shot process. Cycloaliphatic diisocyanates are used as the isocyanate of the reaction mixture. The isocyanate-reactive component comprises at least one polyol wherein the equivalent ratio of hydroxyl groups to amine groups is from 0:1 to 1:1, and at least one chain extender wherein the equivalent ratio of hydroxyl groups to aliphatic amine groups is from 1:2 to 10:1. This invention also relates to the polyurethane/urea molded article produced by the above process.

The production of polyurethane moldings via the reaction injection molding (i.e., RIM) technique is well known and described in, for example, U.S. Pat. No. 4,218,543. The RIM process involves a technique of filling the mold by which highly reactive, liquid starting components are injected into the mold within a very short time by means of a high output, high pressure dosing apparatus after they have been mixed in so-called "positively controlled mixing heads".

In the production of polyurethane moldings via the RIM process, the reaction mixture generally comprises an A-side based on polyisocyanates and a B-side based on organic compounds containing isocyanate-reactive hydrogen atoms, in addition to suitable chain extenders, catalysts, blowing agents, and other additives. The polyisocyanates which are suitable for a commercial RIM process are the aromatic isocyanates such as, for example, diphenyl methane-4,4'-diisocyanate (i.e. MDI).

Various patents such as, for example, U.S. Pat. No. 4,937,366, broadly disclose cycloaliphatic isocyanates, including methylenebis-(cyclohexyl isocyanate) in a long list of isocyanates which are said to be suitable for use in a RIM process. However, very few of the patents which disclose that cycloaliphatic isocyanates are suitable for use in a RIM process have any working examples wherein a cycloaliphatic isocyanate is used. The RIM examples of U.S. Pat. No. 4,937,366 are all based on a prepolymer of an aromatic isocyanate.

High productivity commercial RIM processes require a 30s demold time, and prefer mold temperatures less than about 80° C. for worker safety and energy efficiency. These are briefly described in U.S. Pat. No. 4,937,366. The RIM examples of this reference have a mold temperature of 65° C. and a demold time of 35 seconds.

U.S. Pat. No. 4,772,639 describes a process for the production of polyurethane moldings reacting organic polyisocyanates with organic compounds containing isocyanate-reactive hydrogen atoms in the presence of catalysts and auxiliary agents inside a closed mold. The isocyanate component is based on (a1) mixtures of (i) 1-isocyanate-3,3,5-trimethyl-5-isocyanatomethylcyclohexane (IPDI), and (ii) polyisocyanates containing isocyanurate groups prepared by the trimerization of a portion of the isocyanate groups of 1,6-diisocyanatohexane, or (a2) (i) IPDI and (iii) polyisocyanates containing isocyanurate groups prepared by the trimerization of a portion of the isocyanate groups of a mixture of 1,6-diisocyanatohexane and IPDI. These reaction mixtures are broadly disclosed as being suitable for RIM processing. However, the use of IPDI monomer alone is not disclosed or suggested. The reference also requires unusually long demold times (i.e., from 3 to 10 minutes). These demold times are not commercially acceptable for high speed RIM production.

IPDI has NCO groups of differing reactivity due to steric hindrances. The first NCO group reacts much more quickly than the second NCO group. This fact requires higher mold temperatures and/or longer demold times for RIM systems based on IPDI. Demold times of 3 to 10 minutes are disclosed by U.S. Pat. No. 4,772,639.

U.S. Pat. No. 4,642,320 discloses a process for the preparation of a molded polymer comprising reacting inside a closed mold a reaction mixture comprising (a) an active hydrogen containing material comprising a primary or secondary amine terminated polyether having an average equivalent weight of at least 500, (b) at least one chain extender, and (c) a (cyclo)aliphatic polyisocyanate, polyisothiocyanate, or mixture thereof, wherein the NCX index is from about 0.6 to 1.5. This process requires that component (a) have at least 25%, and preferably 50% of its active hydrogen atoms present in the form of amine hydrogens. All of the examples disclose a system based on a HDI prepolymer with amine terminated polyethers and diethyltoluene diamine at high mold temperatures and long demold times. Although the reference discloses (cyclo)aliphatic isocyanates are suitable for this process, the mold temperatures are higher than normal, i.e. at least 90° C., and the demold times range from about 1 to 5 minutes.

U.S. Pat. No. 4,764,543 discloses aliphatic RIM systems with short demold times (~10 seconds) and low mold temperatures (~70° C.) that use very fast reacting aliphatic polyamines. This patent is restricted to total polyurea systems based on chain extenders which are cycloaliphatic diamines and polyethers which are amine-terminated polyethers, with an aliphatically bound polyisocyanate.

RIM systems are also disclosed in U.S. Pat. No. 4,269,945. These systems are based on compositions comprising a polyisocyanate, a hydroxyl-containing polyol, and a specific chain extender. The specific chain extender comprises (1) at least one component selected from the group consisting of (a) a hydroxyl-containing material which is essentially free of aliphatic amine hydrogen atoms, and (b) aromatic amine-containing materials containing at least two aromatic amine hydrogen atoms and are essentially free of aliphatic amine hydrogen atoms; and (2) at least one aliphatic amine-containing material having at least one primary amine group and an average aliphatic amine hydrogen functionality of from about 2 to 16. Both aromatic polyisocyanates and (cyclo)aliphatic polyisocyanates are disclosed as being suitable for this process. All of the working examples in this patent use aromatic isocyanates that may be polymeric in nature. Demold times of 60 seconds are disclosed for the examples even though comparatively faster reacting aromatic isocyanates are used.

U.S. Pat. No. 5,260,346 also discloses reaction systems for preparing elastomers via the RIM process. These systems require an aliophanate modified polyisocyanate, a hydroxyl group containing polyol, and an aromatic polyamine having at least one of the positions ortho to the amine substituted with a lower alkyl substituent.

U.S. Patent 5,502,147, which is commonly assigned, describes aliphatic isocyanate based RIM systems. These aliphatic isocyanates have a viscosity of less than 20,000 mPa's at 25° C., an NCO functionality of 2.3 to 4.0, and are modified by isocyanurate groups, biuret groups, urethane groups, allophanate groups, carbodiimide groups, oxadiazine-trione groups, uretdione groups, and blends thereof. All of the working examples of this application use hexamethylene diisocyanate with one of the above modifications.

U.S. Pat. No. 5,502,150, which is commonly assigned, discloses a RIM process which uses a hexamethylene diisocyanate prepolymer having a functionality of less than 2.3, an NCO content of 5 to 25%, and a monomer content of less than 2% by weight. This prepolymer is reacted with a high molecular weight isocyanate-reactive compound, a chain extender selected from diols and aminoalcohols, and a hydroxyl-based crosslinking compound containing no more than 1 aliphatic amine hydrogen atom.

Copending application Ser. No. 08/484,402, filed Jun. 7, 1995, which is commonly assigned, discloses a method of producing window gaskets of polyurethane/urea compositions. These polyurethane/urea compositions comprise a (cyclo)aliphatic polyisocyanate having a viscosity of less than 25,000 mPa's at 25° C. and an average NCO functionality of about 2.0 to 4.0, with an isocyanate-reactive composition comprising a high molecular weight isocyanate-reactive component and a low molecular weight chain extender, in the presence of a catalyst wherein the reactive components are selected such that the final polyurethane/urea composition has a crosslink density of at least 0.3 moles/kg.

Advantages of the presently claimed invention include the fact that these systems use unmodified diisocyanate monomers and not prepolymers. This eliminates the cost and complication of an extra manufacturing step. Since methylenebis(cyclohexyl isocyanate), one of the preferred isocyanates of the present invention, is not significantly volatile at room temperature, them is no need to make a prepolymer and strip off the excess monomer as in U.S. Pat. No. 5,502,150. Also, unlike diphenyl methane-4,4'-diisocyanate, methylenebis(cyclohexyl isocyanate) does not solidify at room temperature. Therefore, a prepolymer is unnecessary from a liquidity viewpoint.

Another reason prepolymers are typically used is their performance. However, the elastomers of the present invention have properties which meet or exceed that of the prepolymer based elastomers of U.S. Pat. Nos. 5,502,147 and 5,502,150, respectively. In comparison to U.S. Pat. No. 4,764,543, the presently claimed invention is not all amine based, and reactivity can be tailored via catalyst level adjustments. This is particularly advantageous for large automotive parts. The present invention represents the one way to use cycloaliphatic diisocyanate monomers in commercially viable RIM systems.

SUMMARY OF THE INVENTION

This invention relates to a process for the production of a polyurethane/urea molding from a reaction injection molding process by processing a specific reaction mixture via the one-shot process at an isocyanate index of from 80 to 130. The reaction mixture comprises:

a) a cycloaliphatic polyisocyanate, and b) an isocyanate-reactive component comprising:

b1) from 40 to 90% by weight of one or more isocyanate-reactive compounds having a number average molecular weight of from about 500 to 8000 and containing an average number of functional groups of from 1.5 to 4.0, wherein said functional groups are selected from the group consisting of hydroxyl groups, primary amine groups and secondary amine groups, with the equivalent ratio of hydroxyl groups to amine groups being from 0:1 to 1:1, preferably from 0:1 to 0.5:1, and b2) from 10 to 60% by weight of one or more organic chain extenders having molecular weights of from about 60 to 500, and being selected from the group consisting of diols, triols, primary aliphatic amines, secondary aliphatic amines, amino alcohols and mixtures thereof, wherein said chain extender or mixture thereof has an OH:NH equivalent ratio of from 1:2 to 10:1, preferably from 1:1 to 5:1, wherein the percent by weight of components b1) and b2) totalling 100% of component b), and c) from 0.1 to 10% by weight, based upon the weight of component b), of one or more catalysts for catalyzing the reaction between the isocyanate groups and the isocyanate-reactive groups, wherein the reaction mixture is processed via the one-shot process at an isocyanate index of 80 to 130, preferably from 90 to 115.

The present invention also relates to the polyurethane/urea molded article produced by the above process.

DESCRIPTION OF THE INVENTION

Suitable cycloaliphatic polyisocyanates for the presently claimed process include, for example, isophorone diisocyanate, methylenebis-(cyclohexyl isocyanate), cyclohexane diisocyanate, 1,3-diisocyanato-4-methylcyclohexane and its isomers, 1,3-diisocyanato-4-methylcyclohexane.

Methylenebis(cyclohexyl isocyanate) and isophorone diisocyanate are preferred isocyanates. No particular isomer distribution of methylene-bis(cyclohexyl isocyanate) is required, so it may be present as a solid, semi-solid, slurry, or a liquid. Preferably, methylenebis(cyclohexyl isocyanate) is present in a liquid state at 25° C. (room temperature). Most preferably, the methylenebis(cyclohexyl isocyanate) used in the present invention has an isomer distribution such that it contains about 20% by weight of the trans,trans-isomer, about 46% by weight of the cis,trans-isomer, and about 34% by weight of the cis, cis-isomer.

Also necessary for preparing the polyurethane/urea molded products via the RIM process is an isocyanate reactive component, i.e. component b). According to the present invention, component b) comprises b1) one or more isocyanate-reactive compounds containing hydroxyl or amine groups; and b2) one or more organic chain extenders.

The isocyanate-reactive component b) to be used in the process according to the invention comprises components b1) one or more isocyanate-reactive compounds containing hydroxyl or amino groups. Suitable compounds have number average molecular weights of from about 500 to 8000, preferably 2000 to 6000, and contain an average number of functional groups of from 1.5 to 4.0, preferably from 1.8 to 3.0. These functional groups of these compounds are selected from the group consisting of hydroxy groups, primary amine groups and secondary amine groups, with the equivalent ratio of hydroxyl groups to amine groups being from 0:1 to 1:1, and preferably from 0:1 to 0.5:1. Examples of suitable compounds to be used as component b1) include the hydroxyl terminated polyethers, polyesters, polythioethers, polyacetals, polycarbonates, and amine terminated polyethers containing from 1 to 4 isocyanate-reactive groups of the type known for the production of polyurethanes.

The high molecular weight hydroxyl terminated polyethers suitable for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably, ethylene oxide and propylene oxide, in admixture or successively to components containing reactive hydrogen atoms such as water, alcohols or amines. Examples of suitable alcohols and amines include the low molecular weight chain extenders set forth hereinafter, propylene glycol, glycerin, ethylene glycol, triethanolamine, water, trimethylolpropane, bisphenol A, sucrose, aniline, ammonia, ethanolamine and ethylene diamine. It is preferred to use polyethers which contain substantial amounts of primary hydroxyl groups in terminal positions (greater than 80% by weight, based on all of the terminal hydroxyl groups present in the polyether).

Polyether polyols are preferably used as component b1) in the invention. Preferred polyethers include, for example, those compounds based on di- or tri-functional starters such as, for example, water, ethylene glycol, propylene glycol, glycerin, trimethylolpropane, or triethanolamine. These preferred compounds include copolymers of ethylene oxide and propylene oxide with greater than 10% by weight of the oxides being ethylene oxides.

Suitable examples of high molecular weight polyesters include, for example, the reaction products of polyhydric, preferably dihydric alcohols (optionally, in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above-identified U.S. patents. Finally, representatives of the many and varied compounds which may be used in accordance with the invention may be found, for example, in High Polymers, Volume XVI, "Polyurethanes, Chemistry and Technology," by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl Hanser Verlag, Munich, 1966, pages 45–71.

Also suitable are so-called amine terminated polyethers (ATPEs) containing primary or secondary (preferably primary) aromatically or aliphatically (preferably aliphatically) bound amino groups, wherein amino end groups can also be attached to the polyether chain through urethane, ester or ether groups. These ATPEs can be prepared by any of several methods known in the art. For example, amine terminated polyethers can be prepared from polyhydroxyl polyether (e.g., polypropylene glycol ethers) by a reaction with ammonia in the presence of Raney nickel and hydrogen (Belgian Patent No. 634,741). Polyoxyalkylene polyamines can be prepared by reaction of the corresponding polyol with ammonia and hydrogen in the presence of a nickel, copper, chromium catalyst (U.S. Pat. No. 3,654,370). The preparation of polyethers containing amino end groups by the hydrogenation of cyanoethylated polyoxypropylene ethers is described in German Patent 1,193, 671. Other methods for the preparation of polyoxyalkylene (polyether) amines are described in U.S. Pat. Nos. 3,155,728 and 3,236,895 and in French Patent No. 1,551,605. French Patent No. 1,466,708 discloses the preparation of polyethers containing secondary amino end groups. Also useful are the polyether polyamines described in U.S. Pat. Nos. 4,396,729, 4,433,067, 4,444,910 and 4,530,941.

ATPEs obtained by the hydrolysis of compounds containing isocyanate end groups can be employed herein. For example, in a process disclosed in German Offenlegungsschrift 2,948,419, polyethers containing hydroxyl groups (preferably two or three hydroxyl groups) react with polyisocyanate groups and are then hydrolyzed in a second step to amino groups. Preferred ATPEs are prepared by hydrolyzing an isocyanate compound having an isocyanate group content of from 0.5 to 40% by weight. The most preferred polyethers are prepared by first reacting a polyether containing two or four hydroxyl groups with an excess of an aromatic polyisocyanate to form an isocyanate terminated prepolymer and then converting the isocyanate groups to amino groups by hydrolysis. Processes for the production of useful ATPEs using isocyanate hydrolysis techniques are described in U.S. Pat. Nos. 4,386,218, 4,456,730, 4,472,568, 4,501,873, 4,515,923, 4,525,534, 4,540,720, 4,578,500 and 4,565,645; European Patent 097,299; and German Offenlegungsschrift 2,948,419, all the disclosures of which are herein incorporated by reference. Similar products are also described in U.S. Pat. Nos. 4,506,039, 4,525,590, 4,532,266, 4,532,317, 4,723,032, 4,724,252, 4,855,504, 4,931,595 5,283,364 and in U.S. application Ser. No. 908,535 (filed Sep. 16, 1986, abandoned), the disclosures of which are hereby incorporated by reference.

The ATPEs used in the present invention are in many cases mixtures with any of the above-mentioned compounds.

In another embodiment, the polyhydroxyl compound b1) may additionally comprise: i) a dispersion of a polyurea and/or polyhydrazo-dicarbonamide in a relatively high molecular weight organic compound containing at least two hydroxyl groups, ii) a polymer polyol prepared by polymerizing an ethylenically unsaturated monomer or monomers in a relatively high molecular weight organic compound containing at least two hydroxyl groups, or iii) blends thereof. It is possible to use these types of polyols either alone, or in conjunction with the conventional polyethers described hereinabove.

These types of polyols are known, and can be characterized as hydroxyl containing compounds which contain high molecular weight polyadducts, polycondensates, or polymers in finely dispersed or dissolved form. Such polymers may be obtained by polyaddition reactions (for example, reactions between polyisocyanates and am inofunctional compounds) and polycondensation reactions (for example, between formaldehyde and phenols and/or amines) in situ in the hydroxyl group containing compound. Such processes are described in, for example, German Auslegeschriften 1,168,075 and 1,260,142, the disclosures of which are herein incorporated by reference, and in German Offenlegungsschrifien 2,324,134, 2,423,984, 2,512,385, 2,513,815, 2,550, 796, 2,550,797, 2,550,833, 2,550,862, 2,633,293, and 2,639, 254, the disclosures of which are herein incorporated by reference. See also U.S. Pat. Nos. 3,325,421, 4,042,537, 4,089,835, 4,293,470, 4,296,213, 4,374,209, and 4,786,706, the disclosures of which are herein incorporated by reference. Polyols of this type are commercially available from Bayer Corporation and Bayer AG. Also useful are the so-called polymer polyols obtained by polymerizing one or more ethylenically unsaturated monomers in a hydroxy group containing compound. Polyols modified by vinyl polymers, of the type formed, for example, by polymerizing styrene or acrylonitrile or both together in the presence of polyether polyol are also suitable, as are polybutadienes containing OH groups. Such polymer polyols are described in U.S. Pat. Nos. 3,383,351, 3,304,273, 3,523,093, 3,110,685, and RE 28,715 and 29,118, and German Patent 1,152,536, the disclosures of which are herein incorporated by reference. Polymer polyols are commercially available from Bayer AG, BASF, and ARCO.

The preferred PHD polyols include, for example, the polyurea of toluene diisocyanate and hydrazine dispersed in polyether polyol, and the preferred polymer polyols include, for example, those based on the monomers, styrene and acrylonitrile.

It is most preferred that component b)1) comprises a hydroxyl terminated polyether polyol having a molecular weight of about 2000 to 6000, such as, for example, those started from glycerin, trimethylol propane, and ethylene glycol, followed by ethoxylation and/or propoxylation; or an ATPE such as, for example, Jeffamine D-2000, Jeffamine T-3000 and Jeffamine T-5000, commercially available from Huntsman Corporation.

The isocyanate-reactive component b) additionally comprises component b2) one or more organic chain extenders. Suitable organic chain extenders to be used as component b2) have a molecular weight of from about 60 to 500, preferably from 61 to 400. Suitable chain extenders are selected from the group consisting of diols, triols, primary amines, secondary amines, amino alcohols and mixtures thereof, wherein the OH: NH equivalent ratio of the chain extender (or chain extender mixture) is from 1:2 to 10:1, preferably from 1:1 to 5:1.

Suitable organic diols and triols to be used as component b2) according to the invention include, for example, diols and triols having molecular weights as described above, include, for example, 2-methyl-1,3-propanediol, ethylene glycol, 1,2- and 1,3-propanediol, 1,3- and 1,4- and 2,3-butanediol, 1,6-hexanediol, 1,10-decanediol, diethylene glycol, triethylene glycol, tetraethylene glycol, dipropylene glycol, tripropylene glycol, glycerol, trimethylolpropane, neopentylglycol, 2,2,4-trimethyl-pentane-1,3- diol, and cyclohexanedimethanol. Preferred diols and triols include, for example, 1,4-butanediol, 2-methyl-1,3-propanediol, ethylene glycol and trimethylolpropane.

Suitable amine compounds to be used as component b2) according to the invention include organic primary amines, secondary amines, and amino alcohols having molecular weights as described above include, for example, 2-methyl-1,5-pentanediamine, diethanolamine, monoethanolamine, monoisopropanolamine, diisopropanolamine, ethylene diamine, 1,3-diaminopropane, 1,4-diaminobutane, isophorone-diamine, diethylenetriamine, ethanolamine, aminoethylethanolamine, diaminocyclohexane, hexamethylenediamine, methyliminobispropylamine, iminobispropylamine, bis(aminopropyl)-piperazine, aminoethyl piperazine, 1,2-diaminocyclohexane, polyoxyalkyleneamines, bis-(p-aminocyclo-hexyl)methane, triethylenetetramine, tetraethylenepentamine, mixtures thereof, and the like.

Other suitable amines include, for example, 1,8-p-diaminomenthane, bis(4-aminocyclohexyl)methane, bis(4-amino-3-methylcyclohexyl)-methane, bis(4-amino-3,5-dimethylcyclohexyl)methane, bis(4-amino-2,3,5-trimethylcyclohexyl)methane, 1,1-bis(4-aminocyclohexyl) propane, 2,2-(bis(4-aminocyclohexyl)propane, 1,1-bis(4-aminocyclohexyl)ethane, 1,1-bis(4-aminocyclohexyl) butane, 2,2-bis(4-aminocyclohexyl)butane, 1,1-bis(4-amino-3-methylcyclohexyl)ethane, 2,2-bis(4-amino-3-methylcyclo-hexyl)propane, 1,1-bis(4-amino-3,5-dimethylcyclohexyl)ethane, 2,2-bis(4-amino-3,5-dimethylcyciohexyl)propane, 2,2-bis(4-amino-3,5-dimethylcyclo-hexyl)butane, 2,4-diaminodicyclohexylmethane, 4-aminocyclohexyl-4-amino-3-methylcyclohexylmethane, 4-amino-3,5-dimethylcyclohexyl-4-amino-3-methylcyclohexyimethane, and 2-(4-aminocyclohexyl)-2-(4-amino-3-methylcyclohexyl)methane.

It is also possible to use the so-called amine terminated polyethers (ATPEs) having low molecular weights. The suitable amine terminated polyethers include, for example, those containing primary or secondary (preferably primary) aromatically or aliphatically (preferably aliphatically) bound amino groups, wherein amino end groups can also be attached to the polyether chain through urethane or ester groups. Suitable compounds include, for example, Jeffamine T-403, Jeffamine D-400 and Jeffamine D-230.

These low molecular weight amine terminated polyethers can be prepared by any of several methods known in the art. For example, amine terminated polyethers can be prepared from polyhydroxyl polyether (e.g., polypropylene glycol ethers) by a reaction with ammonia in the presence of Raney nickel and hydrogen (Belgian Patent No. 634,741 ). Polyoxyalkylene polyamines can be prepared by reaction of the corresponding polyol with ammonia and hydrogen in the presence of a nickel, copper, chromium catalyst (U.S. Pat. No. 3,654,370). The preparation of polyethers containing amino end groups by the hydrogenation of cyanoethylated polyoxypropylene ethers is described in German Patent 1,193,671. Other methods for the preparation of polyoxyalkylene (polyether) amines are described in U.S. Pat. Nos. 3,155,728 and 3,236,895 and in French Patent No. 1,551,605. French Patent No. 1,466,708 discloses the preparation of polyethers containing secondary amino end groups. Also useful are the polyether polyamines described in U.S. Pat. Nos. 4,396,729, 4,433,067, 4,444,910 and 4,530,941.

ATPEs obtained by the hydrolysis of compounds containing isocyanate end groups can also be employed herein. For example, in a process disclosed in German Offenlegungsschrift 2,948,419, polyethers containing hydroxyl groups (preferably two or three hydroxyl groups) react with polyisocyanate groups and are then hydrolyzed in a second step to amino groups. Preferred amine terminated polyethers are prepared by hydrolyzing an isocyanate compound having an isocyanate group content of from 0.5 to 40% by weight. The most preferred polyethers are prepared by first reacting a polyether containing two or four hydroxyl groups with an excess of an aromatic polyisocyanate to form an isocyanate terminated prepolymer and then converting the isocyanate groups to amino groups by hydrolysis.

Processes for the production of useful amine terminated polyethers using isocyanate hydrolysis techniques are described in U.S. Pat. Nos. 4,386,218, 4,456,730, 4,472,568, 4,501,873, 4,515,923, 4,525,534, 4,540,720, 4,578,500 and 4,565,645; European Patent 097,299; and German Offenlegungsschrift 2,948,419, all the disclosures of which are herein incorporated by reference. Similar products are also described in U.S. Pat. Nos. 4,506,039, 4,525,590, 4,532,266, 4,532,317, 4,723,032, 4,724,252, 4,855,504, 4,931,595 5,283,364 and in U.S. application Ser. No. 908,535 (filed Sep. 16, 1986, abandoned, the disclosures of which are hereby incorporated by reference.

The amine terminated polyethers used in the present invention are in many cases mixtures with any of the above-mentioned compounds.

Preferred amine compounds for component b2) include diethanolamine, monoethanolamine, and low molecular weight amine terminated polyethers such as, for example, Jeffamine T-403 and Jeffamine D-400.

Aromatic diamines are preferably not included as part of the chain extender mixture.

The process of the invention also requires at least one catalyst capable of catalyzing the reaction between the isocyanate groups of a) and the isocyanate-reactive groups of b). It is preferred that the catalyst(s) is optimized both in terms of quantity and chemical composition so as to achieve a 30s demold time in the process.

In a preferred embodiment, the catalyst comprises c1) at least one catalyst selected from the group consisting of metal carboxylates, metal halides, ammonium carboxylates, and mixtures thereof. Of the metal halides, the metal chlorides are preferred. These catalysts may be used alone or in conjunction with c2) at least one tin-sulfur catalyst, and/or c3) at least one tertiary amine catalyst.

Some examples of catalysts suitable for use as c1) catalysts include metal carboxylates including, for example, tin carboxylates such as, for example, dimethyltin dilaurate, dibutyltin dilaurate and bismuth carboxylates, such as, for example, bismuth trineodecanoate. Some suitable examples of metal halides include, for example, tin halides and especially tin chlorides, such as, for example, dimethyltin dichloride. Suitable examples of ammonium carboxylates include, for example, trimethylhydroxyethylammonium-2-ethylhexanoate (i.e., Dabco TMR). Tin carboxylates such as, for example, dimethyltin dilaurate and dibutyltin dilaurate, and bismuth carboxylates, such as, for example, bismuth trineodecanoate are preferred catalysts to be used as component c1). Metal chlorides, such as, for example, dimethyltin dichloride are also preferred catalysts to be used as component c1).

Suitable compounds to be used as tin-sulfur catalysts c2) include, for example, dialkyltin dilaurylmercaptides, such as, for example, dibutyltin dilaurylmercaptide and dimethyltin dilaurylmercaptide.

Suitable catalysts to be used as tertiary amine catalysts c3) include, for example, triethylamine, triethylenediamine, tributylamine, N-methylmorpholine, N-ethylmorpholine, triethanolamine, triisopropanol-amine, N-methyldiethanolamine, N-ethyldiethanolamine, and N,N-dimethylethanolamine.

Other additives which may be used in the RIM process according to the present invention include surface-active additives such as emulsifiers and foam stabilizers. Examples include N-stearyl-N',N'-bis-hydroxyethyl urea, oleyl polyoxyethylene amide, stearyl diethanoi amide, isostearyl diethanolamide, polyoxyethylene glycol monoleate, a pentaery-thritol/adipic acid/oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may also be used as surface-active additives.

Suitable foam stabilizers include water-soluble polyether siloxanes. The structure of these compounds is generally such that a copolymer of ethylene oxide and propylene oxide is attached to a polydimethyl siloxane radical. Such foam stabilizers are described, for example, in U.S. Pat. No. 2,764,565. In addition to the catalysts and surface-active agents, other additives which may be used in the molding compositions of the present invention include known blowing agents including nitrogen, cell regulators, flame retarding agents, plasticizers, antioxidants, UV stabilizers, hindered amine light stabilizers (HALS), adhesion promoters, dyes, fillers and reinforcing agents such as glass in the form of fibers or flakes or carbon fibers. Suitable antioxidants include, for example, Irganox 245, suitable UV absorbers include, for example, Tinuvin 328, and suitable hindered amine light stabilizers (HALS) include, for example, Tinuvin 765. However, any of the known antioxidants and/or UV stabilizers may be used. As set forth hereinabove, specific advantages have been found in reaction mixtures containing antioxidants and/or UV stabilizers have been added.

It is also possible to use the known internal mold release agents, such as, for example, zinc stearate, in the RIM process of the invention. As is known to one of ordinary skill in the art, in the RIM process, an isocyanate, and active hydrogen containing compounds are mixed and injected into molds, wherein the reactants are allowed to react fully.

The molded products of the present invention are prepared by reacting the components in a closed mold via the RIM process. The compositions according to the present invention may be molded using conventional processing techniques at isocyanate indexes ranging from about 80 to 130, preferably from 90 to 115. By the term "Isocyanate Index" (also commonly referred to as NCO index), is defined herein as the equivalents of isocyanate, divided by the total equivalents of isocyanate-reactive hydrogen containing materials, multiplied by 100.

In general, in a RIM process, two separate streams are intimately mixed and subsequently injected into a suitable mold, although it is possible to use more than two streams. The first stream contains the polyisocyanate component, while the second stream contains ,the isocyanate reactive components and any other additive which is to be included.

As used herein, the term "molecular weight" refers to the number average molecular weight.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

The RIM machine used to make the parts was a Hennecke RIM-DO-MAT RIM machine with a Hennecke mQ-8 mixhead. The parts were molded in an end-gated rectangular mold (3×200×300 mm). The injection pressure was 200 bar on the polyol and isocyanate side. The throughput in the mixhead was maintained at 200 g/s. A polyol blend was made in the proportions indicated in Table 1 below. The polyol blend was put into the RIM machine and heated to the temperature shown in Table 2 below. The isocyanate was added to the RIM machine and heated to the temperature shown in Table 2 below. The machine was set up for 200 bar injection pressure and 200 g/s throughput. Parts could not be made from Formulations 1-3 as shown in Table 1 below under these conditions. This was due to the premature gelation of the system in the mixhead which activated the high pressure safety limit switch for the RIM machine. The other formulations (4–12) were processed, under the above conditions, as indicated in the table. Formulations 4–12 yielded molded parts.

Table 2 shows the processing details for each example. Table 3 shows the physical properties for the examples from which it was possible to produce molded parts.

ASTM methods used were as follows:

| D790 | flexural modulus |
|---|---|
| D412 | tensile strength; and elongation |
| D624 | die C tear strength |

The following components were used in the formulations:

Iso A: methylenebis(cyclohexyl isocyanate) having an isomer distribution of 20% trans,trans-isomer, 46% of cis,trans-isomer and 34% of cis,cis-isomer Iso B: isophorone diisocyanate ATPE A: a trifunctional, 3000 molecular weight amine terminated polypropylene glycol, commercially available from Huntsman Corporation as Jeffamine T-3000

ATPE B: a difunctional, 2000 molecular weight amine terminated polypropylene glycol, commercially available from Huntsman Corporation as Jeffamine D-2000

ATPE C: a difunctional, 400 molecular weight amine terminated polypropylene glycol, commercially available from Huntsman Corporation as Jeffamine D-400

ATPE D: a trifunctional amine terminated polypropylene glycol, having a molecular weight of about 400; commercially available from Huntsman Corporation as Jeffamine T-403

Polyol A: a glycerin started propylene oxide/ethylene oxide polyether (83 wt. % PC, 17 wt. % EO), having an OH number of about 60

Polyol B: a glycerin started propylene oxide/ethylene oxide polyether (83 wt. % PC, 17 wt. % EO), having an OH number of about 35

Polyol C: a glycerin started propylene oxide/ethylene oxide polyether (87 wt. % PC, 13 wt. % EO), having an OH number of about 28

Polyol D: 2-methyl-1,3-propanediol

Polyol E: trimethylolpropane

Diamine A: isophoronediamine

Diamine B: 1,2-diaminocyclohexane

Diamine C: 4,4'-diaminodicyclohexylmethane

AA: monoethanolamine

Catalyst A: dimethyltin dilaurate, commercially available from Witco Corporation as Fomrez UL-28

Pigment A: a blend of Polyol C (91.1 wt. %) and carbon black (8.9 wt. %)

Tinuvin 765: a hindered amine light stabilizer (HALS), commercially available from Ciba-Geigy Inc.

Irganox 245: an antioxidant, commercially available from Ciba-Geigy Inc.

TABLE 1

| Example | 1 | 2 | 3 | 4 | 5 | 6 |
|---|---|---|---|---|---|---|
| ATPE A | | | | | 88 | 73 |
| ATPE B | 100 | 90 | 90 | | | |
| Polyol A | | | | | 88 | |
| Diamine A | | 10 | | | | |

TABLE 1-continued

| Diamine B | | | 10 | | | |
|---|---|---|---|---|---|---|
| ATPE C | | | | | | 13 |
| Diamine C | 20 | | | | | |
| AA | | | | 10 | 10 | 2 |
| Polyol D | | | | | | 10 |
| Catalyst A | | | | 2 | 2 | 2 |

| Example | 7 | 8 | 9 | 10 | 11 | 12 |
|---|---|---|---|---|---|---|
| ATPE A | | 79.4 | 64.5 | 41 | | 66.7 |
| Polyol A | 73 | | | | | |
| Polyol B | | | | 41 | 64 | |
| ATPE C | 13 | | 13 | | 13 | |
| ATPE D | | | | | | 8.3 |
| Diamine C | | 6.6 | | | | |
| AA | 2 | 2 | | 10 | 3 | |
| Polyol D | 10 | 10 | 10 | | 7.5 | 15 |
| Polyol E | | | 2.5 | | 2.5 | |
| Catalyst A | 2 | 2 | 2 | 2 | 2 | 2 |
| Pigment A | | | 4 | 2 | 4 | 4 |
| Irganox 245 | | | 1 | 1 | 1 | 1 |
| Tinuvin 765 | | | 3 | 3 | 3 | 3 |

TABLE 2

| Example | 1 | 2 | 3 | 4 | 5 | 6 |
|---|---|---|---|---|---|---|
| Surface | NA[1] | NA[1] | NA[1] | G[3] | P[2] | G[3] |
| Isocyanate | A | A | A | A | A | A |
| Iso. Index | 105 | 105 | 105 | 105 | 105 | 105 |
| Iso. Temp (°C.) | 40 | 40 | 40 | 40 | 40 | 40 |
| Polyol Temp. (°C.) | 50 | 50 | 50 | 50 | 50 | 50 |
| Mold Temp. (°C.) | | | | 75 | 95 | 75 |
| Demold Time (sec.) | | | | 30 | 30 | 30 |

| Example | 7 | 8 | 9 | 10 | 11 | 12 |
|---|---|---|---|---|---|---|
| Surface | P[2] | G[3] | G[3] | G[3] | P[2] | G[3] |
| Isocyanate | A | A | A | A | B | B |
| Iso. Index | 105 | 105 | 105 | 105 | 105 | 105 |
| Iso. Temp (°C.) | 40 | 40 | 40 | 40 | 50 | 50 |
| Polyol Temp. (°C.) | 50 | 50 | 50 | 50 | 50 | 50 |
| Mold Temp. (°C.) | 95 | 75 | 70 | 80 | 90 | 90 |
| Demold Time (sec.) | 30 | 30 | 30 | 30 | 30 | 30 |

[1]: NA: no parts could be molded due to high reactivity
[2]: Poor surface quality: molded parts exhibited orange peel surface defects.
[3]: Good surface quality: molded parts exhibited smooth, high gloss surface.

TABLE 3

| Example | 1 | 2 | 3 | 4 | 5 | 6 |
|---|---|---|---|---|---|---|
| Flexural Modulus (psi) | | | | 22,300 | | 26,700 |
| Elongation (%) | | | | 280 | | 305 |
| Tensile Strength (psi) | | | | 4,000 | | 4,450 |
| Tear Strength (pli) | | | | 440 | | 495 |

| Example | 7 | 8 | 9 | 10 | 11 | 12 |
|---|---|---|---|---|---|---|
| Flexural Modulus (psi) | | 34,300 | 9,600 | 11,000 | | 13,400 |

TABLE 3-continued

| | | | | |
|---|---|---|---|---|
| Elongation (%) | 225 | 235 | 245 | 325 |
| Tensile Strength (psi) | 3,800 | 2,550 | 2,050 | 2,800 |
| Tear Strength (pli) | 500 | 350 | 255 | 420 |

Examples 4, 6, 8, 9, 10 and 12 are illustrative of the invention. The remaining examples are comparative. Examples 1–3 show that certain aliphatic diamine extenders are too fast for the RIM process even with the methylenebis (cyclohexyl isocyanate). In contrast, an alcohol/amine extender package yields much more favorable results (see Examples 4, 6, 8, and 9). Examples 5 and 7 yielded demoldable parts in the required 30s demold time. However, these systems had very poor surface quality (orange peel). Therefore, the fast reacting ATPE is required to yield parts with good surface quality. Examples 4–9 all had good green-strength at a 30s demold time. Example 10 shows that a 50/50 mixture of Jeffamine ATPE and polyether polyol yields favorable results. In general, the mold temperature was increased (in increments of 5° C.) from a base level of about 70° C. if a system did not have good surface properties. If at 90–95 the system did not have good surface, we stopped the experiment and concluded that the system surface quality was unacceptable.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a polyurethane/urea molding from a reaction injection molding process, wherein said reaction mixture comprises:
   a) an isocyanate component consisting essially of cycloaliphatic diisocyanate,
   and
   b) an isocyanate-reactive component comprising:
      b1) from 40 to 90% by weight of one or more isocyanate-reactive compounds having a molecular weight of from about 500 to 8000 and containing an average number of functional groups of from 1.5 to 4.0, wherein said functional groups being selected from the group consisting of hydroxyl groups, primary amine groups and secondary amine groups, with the OH:NH equivalent ratio being from 0:1 to 1:1,
      and
      b2) from 10 to 60% by weight of one or more organic chain extenders having molecular weights of from about 60 to 500, and being selected from the group consisting of diols, triols, primary aliphatic amines, secondary aliphatic amines, amino alcohols and mixtures thereof, wherein said chain extender or mixture thereof has an OH:NH equivalent ratio of from 1:2 to 10:1, wherein the percent by weight of components b1) and b2) totalling 100% of component b),
   and
   c) from 0.1 to 10% by weight, based upon the weight of component b), of one or more catalyst for catalyzing the reaction between the isocyanate groups and the isocyanate-reactive groups, wherein the reaction mixture is processed via a one-shot process at an isocyanate index of from 80 to 130.

2. The process of claim 1, wherein said isocyanate-reactive compound b1) has an OH:NH equivalent ratio is from 0:1 to 0.5:1.

3. The process of claim 1, wherein said isocyanate-reactive compound b1) has a molecular weight of from about 1000 to 6500.

4. The process of claim 1, wherein said isocyanate-reactive compound b1) is selected from the group consisting of polyoxypropylene diamine, polyoxypropylene triamines and mixtures thereof.

5. The process of claim 1, wherein said chain extender has an OH:NH equivalent ratio of from 1:1 to 5:1.

6. The process of claim 1, wherein said chain extender has a molecular weight of from 61 to 400.

7. The process of claim 1, wherein said chain extender is selected from the group consisting of ethylene glycol, 1,4-butanediol, 2-methyl-1,3-propanediol, trimethylolpropane, monoethanolamine, diethanolamine, triethanolamine, low molecular weight polyoxypropylene diamines, low molecular weight polyoxypropylene triamines and mixtures thereof.

8. The process of claim 1, wherein said reaction mixture comprises from 0.5 to 5% by weight, based on the weight of component b), of said catalyst.

9. The process of claim 1, wherein said reaction mixture comprises from 1 to 4% by weight, based on the weight of component b), of said catalyst.

10. The process of claim 1 wherein said catalyst c) comprises
    c1) from 0.5 to 5.0% by weight, based on the weight of component b), of at least one catalyst selected from the group consisting of metal carboxylates, metal halides, ammonium carboxylates, and mixtures thereof,
    c2) from 0.0 to 5.0% by weight, based on the weight of component b), of at least one tin-sulfur catalyst, and
    c3) from 0.0 to 5.0% by weight, based on the weight of component b), of at least one tertiary amine catalyst, wherein the amount of components c1), c2), and c3) totals 0.5 to 5.0% by weight, based on the weight of component b).

11. The process of claim 10 wherein said catalyst c1) is selected from the group consisting of dimethyltin dilaurate, bismuth trineodecanoate, dimethyltin dichloride, trimethylhydroxyethylammonium-2-ethylhexanoate, and mixtures thereof.

12. The process of claim 1, wherein said cycloaliphatic diisocyanate is selected from the group consisting of methylenebis-(cyclohexyl isocyanate) and isophorone diisocyanate.

* * * * *